US012041587B2

(12) United States Patent
Sirotkin et al.

(10) Patent No.: US 12,041,587 B2
(45) Date of Patent: Jul. 16, 2024

(54) SIGNALING OF NOT AVAILABLE RESOURCES FOR CENTRAL COORDINATION IN IAB NETWORKS

(71) Applicant: Apple Inc., Cupertino, CA (US)

(72) Inventors: Alexander Sirotkin, Tel-Aviv (IL); Qian Li, Beaverton, OR (US); Lili Wei, Portland, OR (US); Dawei Ying, Hillsboro, OR (US); Geng Wu, Portland, OR (US); Jaemin Han, Portland, OR (US); Murali Narasimha, Lake Oswego, OR (US); Youn Hyoung Heo, Seoul (KR); Sudeep K Palat, Cheltenham (GB)

(73) Assignee: Apple Inc., Cupertino, CA (US)

( * ) Notice: Subject to any disclaimer, the term of this patent is extended or adjusted under 35 U.S.C. 154(b) by 529 days.

(21) Appl. No.: 17/286,631

(22) PCT Filed: Oct. 29, 2019

(86) PCT No.: PCT/US2019/058613
§ 371 (c)(1),
(2) Date: Apr. 19, 2021

(87) PCT Pub. No.: WO2020/092403
PCT Pub. Date: May 7, 2020

(65) Prior Publication Data
US 2021/0352666 A1 Nov. 11, 2021

Related U.S. Application Data

(60) Provisional application No. 62/752,806, filed on Oct. 30, 2018.

(51) Int. Cl.
*H04W 72/0446* (2023.01)
*H04W 28/02* (2009.01)
(Continued)

(52) U.S. Cl.
CPC ... *H04W 72/0446* (2013.01); *H04W 28/0263* (2013.01); *H04W 40/22* (2013.01); *H04W 88/08* (2013.01)

(58) Field of Classification Search
CPC . H04W 72/0446; H04W 88/08; H04W 28/16; H04W 40/22; H04W 28/0263
See application file for complete search history.

(56) References Cited

U.S. PATENT DOCUMENTS 11,622,300 B2 * 4/2023 Byun .................. H04W 36/02
370/331
2018/0092139 A1 3/2018 Novlan et al.
(Continued)

OTHER PUBLICATIONS

Intel Corporation, "PHY Layer Enhancements for NR IAB", 3GPP TSG RAN WG1, Meeting #94bis, R1-1810770, Oct. 2018, Chengdu, China, 14 pgs.
(Continued)

*Primary Examiner* — Raj Jain
(74) *Attorney, Agent, or Firm* — Kowert, Hood, Munyon, Rankin & Goetzel, P.C.

(57) ABSTRACT

Embodiments of an integrated access and backhaul (IAB) donor, IAB node, and methods of communication are generally described herein. An IAB network may comprise a plurality of IAB nodes to operate as relays between the IAB donor and one or more User Equipment (UE). The IAB donor may, for each of the IAB nodes, allocate a plurality of subframes to the IAB node. Each allocated subframe may have a subframe type that is one of: a downlink subframe, an uplink subframe, a flexible subframe or a not available subframe. The IAB donor may transmit, from a central unit (CU) of the IAB donor to a distributed unit (DU) an IAB node over an F1 interface, a resource coordination request message that indicates the subframe types of the plurality of subframes.

20 Claims, 8 Drawing Sheets

(51) Int. Cl.
*H04W 40/22* (2009.01)
*H04W 88/08* (2009.01)

(56) References Cited

U.S. PATENT DOCUMENTS

| | | | |
|---|---|---|---|
| 2019/0349834 A1* | 11/2019 | Teyeb | H04W 84/18 |
| 2021/0297892 A1* | 9/2021 | Teyeb | H04W 40/22 |
| 2021/0315043 A1* | 10/2021 | Luo | H04W 76/19 |
| 2021/0352666 A1* | 11/2021 | Sirotkin | H04W 72/0446 |

OTHER PUBLICATIONS

Ericsson, "Updated Summary of 7.2.3.1 Enhancements to Support NR Backhaul Links", 3GPP TSG RAN WG1, Meeting #94bis, R1-1812042, Oct. 2018, Chengdu, China, 22 pgs.
LG Electronics Inc., "Comparison with Proposed IAB Architectures", 3GPP TSG RAN WG3 #101bis, R3-186022, Oct. 2018, Chengdu, China, 6 pgs.
Nokia et al., "NR Enhancements to Support IAB", 3GPP TSG RAN WG1, Meeting #94bis, R1-1810673, Oct. 2018, Chengdu, China, 6 pgs.
International Search Report and Written Opinion for International Application No. PCT/US2019/058613, mailed Feb. 20, 2020, 8 pgs.

\* cited by examiner

US 12,041,587 B2

SIGNALING OF NOT AVAILABLE RESOURCES FOR CENTRAL COORDINATION IN IAB NETWORKS

PRIORITY CLAIM

This application is a U.S. National Stage filing of International Application No. PCT/US2019/058613, filed Oct. 29, 2019, which claims the benefit of and priority to the U.S. Provisional Application No. 62/752,806, filed Oct. 30, 2018. All of the aforementioned applications are incorporated herein by reference in their entireties.

TECHNICAL FIELD

Embodiments pertain to wireless communications. Some embodiments relate to wireless networks including 3GPP (Third Generation Partnership Project) networks, and 3GPP LTE (Long Term Evolution) networks, Fifth Generation (5G) networks, and/or New Radio (NR) networks. Some embodiments relate to integrated access and backhaul (IAB) networks. Some embodiments relate to central coordination of an IAB network. Some embodiments relate to signaling of resources that are not available, including but not limited to subframes that are not available. Some embodiments relate to signaling of not available resources for central coordination in IAB networks.

BACKGROUND

Efficient use of the resources of a wireless network is important to provide bandwidth and acceptable response times to the users of the wireless network. However, often there are many devices trying to share the same resources and some devices may be limited by the communication protocol they use or by their hardware bandwidth. Moreover, wireless devices may need to operate with both newer protocols and with legacy device protocols.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
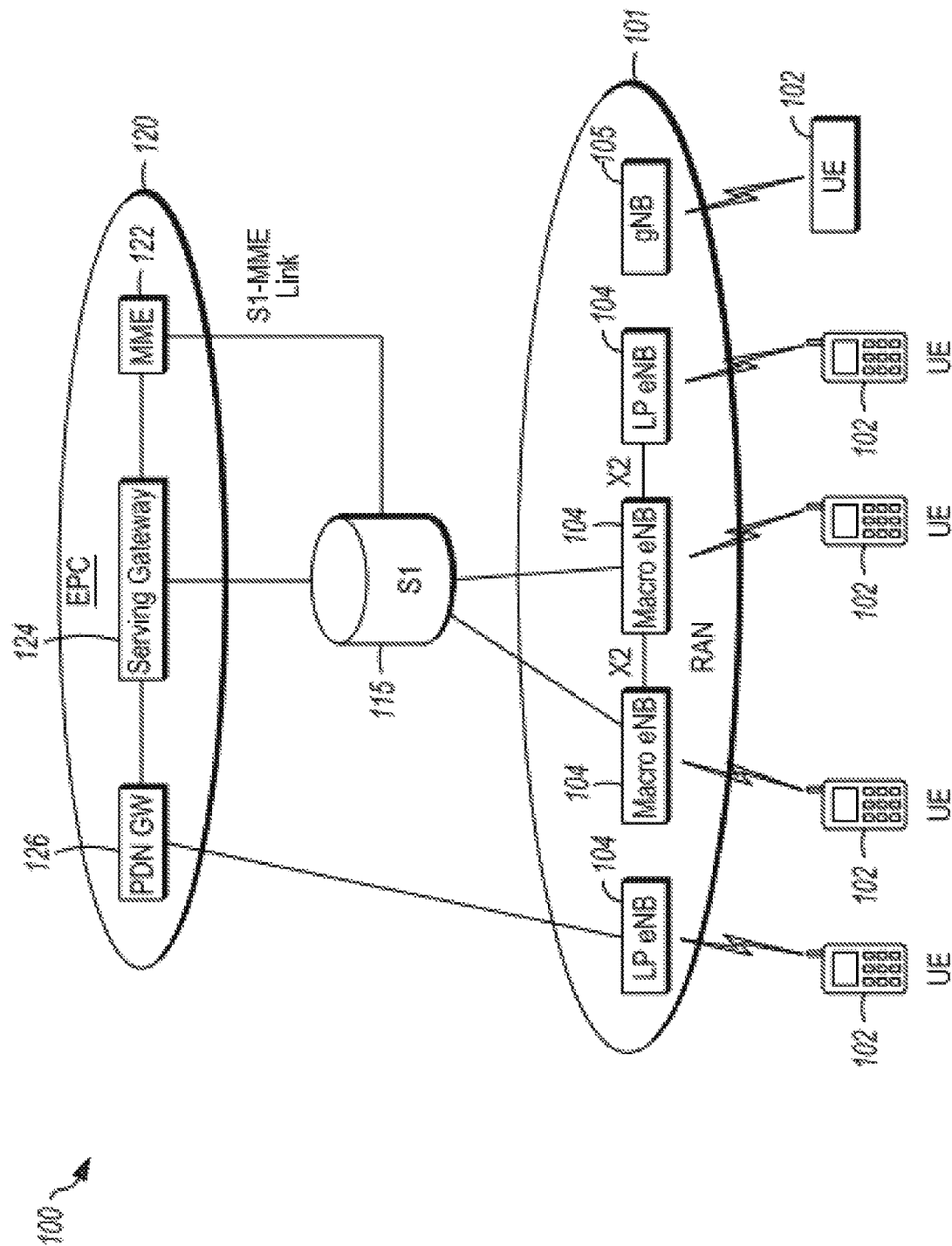
FIG. 1A is a functional diagram of an example network in accordance with some embodiments.
Figure 1B:
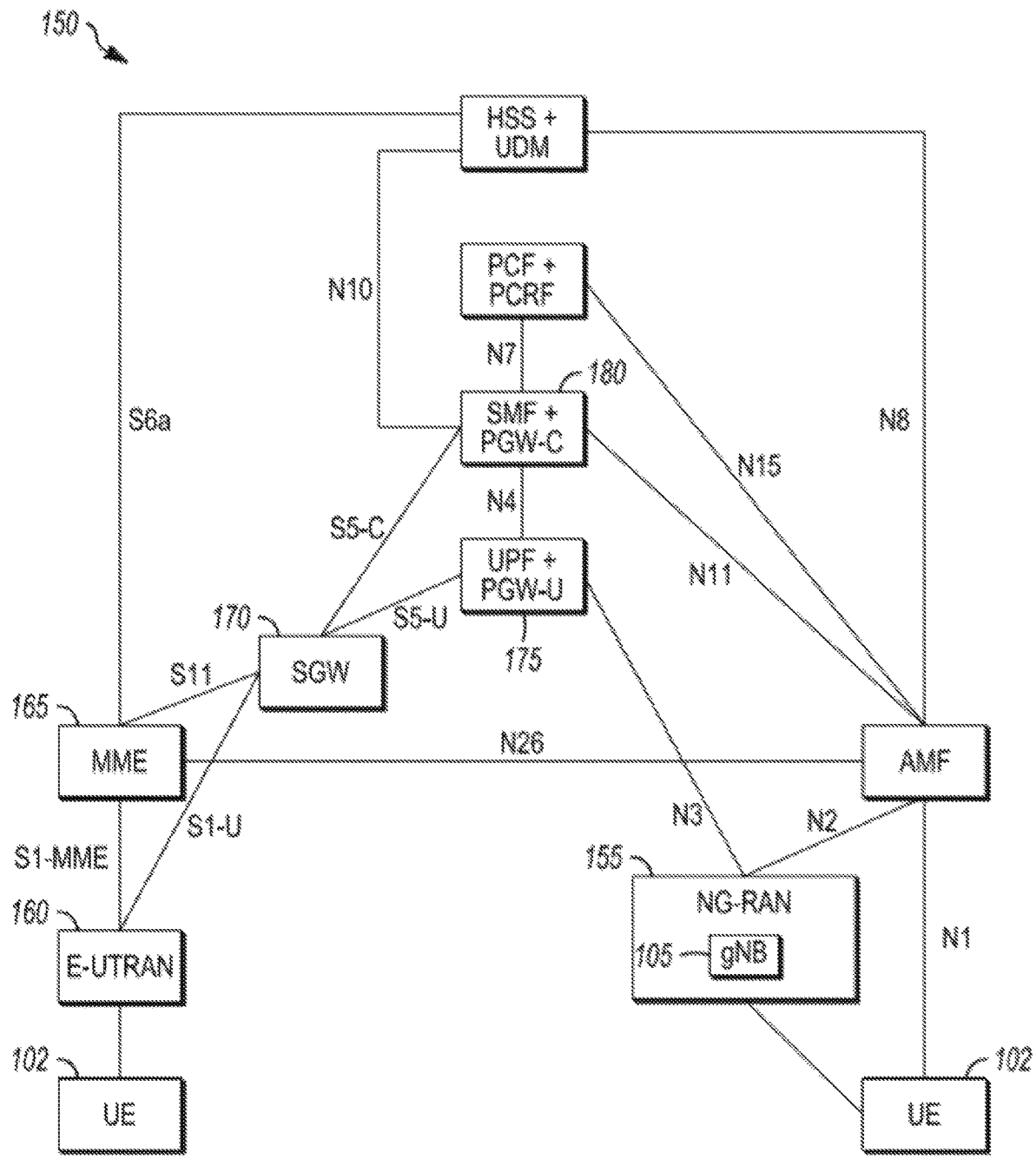
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network, a new radio (NR) network and/or Fifth Generation (5G) network. Other networks may be used in some embodiments. In some embodiments, a network may include one or more of: one or more components shown in FIG. 1A; one or more components shown in FIG. 1B; and one or more additional components. Some embodiments may not necessarily include all components shown in FIG. 1A and FIG. 1B.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In some embodiments, the RAN 101 may include one or more of: one or more components of an evolved universal terrestrial radio access network (E-UTRAN), one or more components of an NR network, and/or one or more other components.

The core network 120 may include a mobility management entity (MME) 122, a serving gateway (serving GW) 124, and packet data network gateway (PDN GW) 126. In some embodiments, the networks 100, 150 may include (and/or support) one or more Evolved Node-B's (eNBs) 104 and/or one or more Next Generation Node-B's (gNBs) 105. The eNBs 104 and/or gNBs 105 may operate as base stations for communicating with User Equipment (UE) 102. In some embodiments, one or more eNBs 104 may be configured to operate as gNBs 105. Embodiments are not limited to the number of eNBs 104 shown in FIG. 1A or to the number of gNBs 105 shown in FIG. 1B. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with one or more of: a 3GPP LTE protocol/standard, an NR protocol/standard, a Fifth Generation (5G) protocol/standard; and/or other protocol/standard, although the scope of embodiments is not limited in this respect.

Descriptions herein of one or more operations, techniques and/or methods practiced by a component (such as the UE 102, eNB 104, gNB 105 and/or other) are not limiting. In some embodiments, one or more of those operations, techniques and/or methods may be practiced by another component.

The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. The serving GW 124 and the MME 122 may be implemented in one physical node or separate physical nodes.

In some embodiments, UEs 102, the eNB 104 and/or gNB 105 may be configured to communicate Orthogonal Frequency Division Multiplexing (OFDM) communication signals over a multicarrier communication channel in accordance with an Orthogonal Frequency Division Multiple Access (OFDMA) communication technique.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165, which may be similar to the MME 122 described herein, although the scope of embodiments is not limited in this respect. In some embodiments, the network 150 may include the SGW 170, which may be similar to the SGW 124 described herein, although the scope of embodiments is not limited in this respect.

Embodiments are not limited to the number or type of components shown in FIG. 1B. Embodiments are also not limited to the connectivity of components shown in FIG. 1B.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
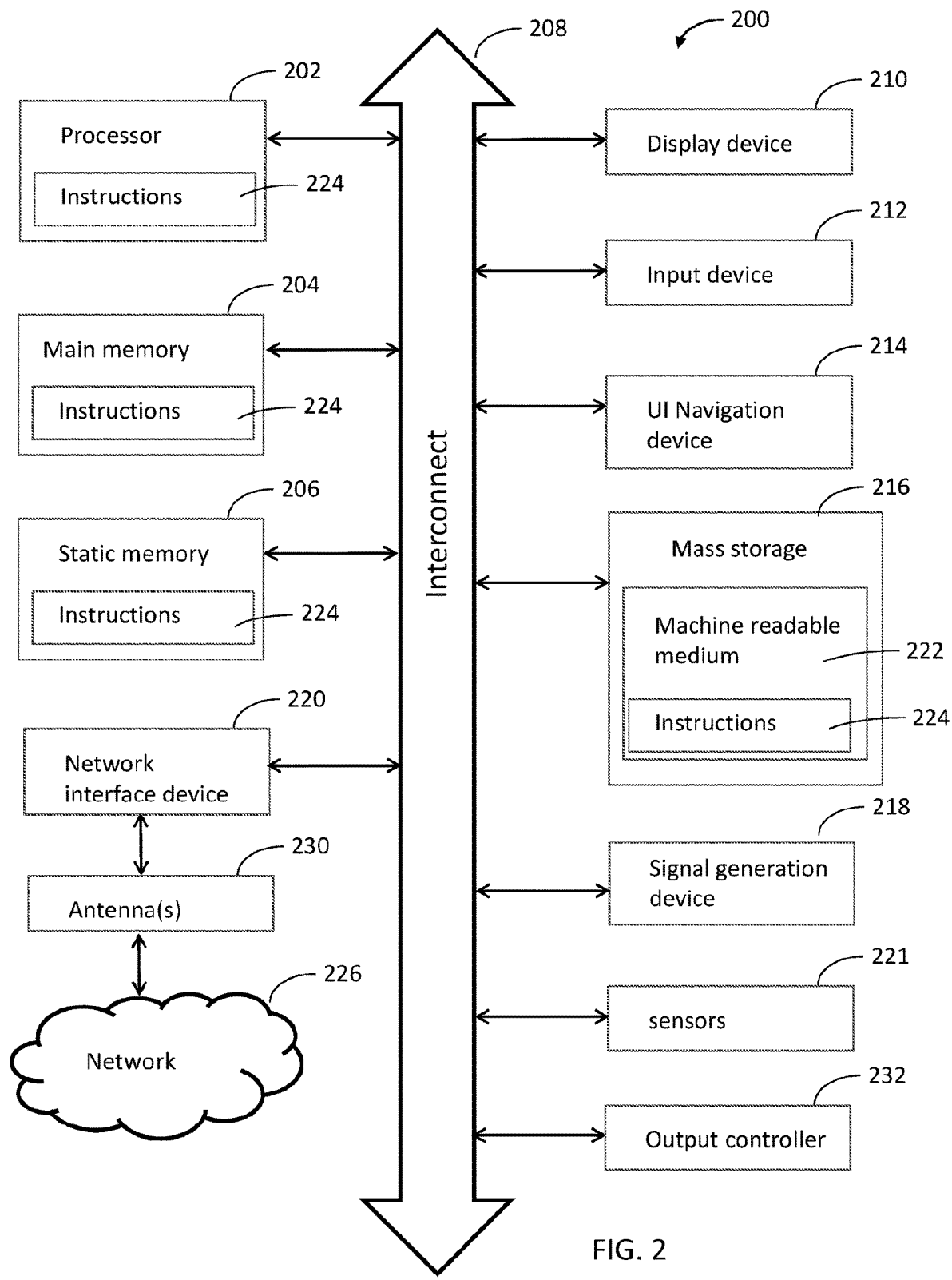
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. The machine 200 may be a UE 102, eNB 104, gNB 105, IAB donor, IAB node, access point (AP), station (STA), user, device, mobile device, base station, another device, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include one or more of 210-228.

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
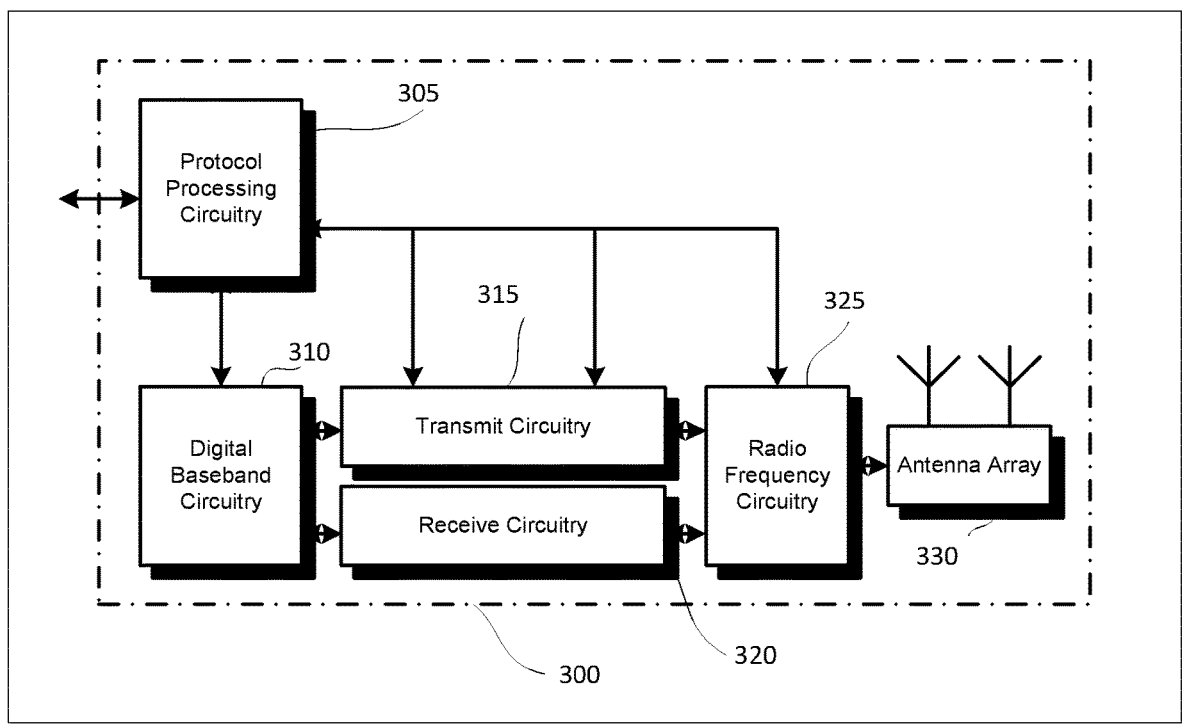
FIG. 3 illustrates an exemplary communication circuitry according to some aspects.

FIG. 3 illustrates an exemplary communication circuitry according to some aspects. It should be noted that a device, such as a UE 102, eNB 104, gNB 105, IAB donor, IAB node, the machine 200 and/or other device may include one or more components of the communication circuitry 300, in some aspects. The communication circuitry 300 may include protocol processing circuitry 305, which may implement one or more of: medium access control (MAC), radio link control (RLC), packet data convergence protocol (PDCP), radio resource control (RRC) and non-access stratum (NAS) functions. The communication circuitry 300 may further include digital baseband circuitry 310, which may implement one or more physical layer (PHY) functions. The communication circuitry 300 may further include transmit circuitry 315, receive circuitry 320 and/or antenna array circuitry 330. The communication circuitry 300 may further include radio frequency (RF) circuitry 325. In an aspect of the disclosure, RF circuitry 325 may include multiple parallel RF chains for one or more of transmit or receive functions, each connected to one or more antennas of the antenna array 330.

In some embodiments, processing circuitry may perform one or more operations described herein and/or other operation(s). In a non-limiting example, the processing circuitry may include one or more components such as the processor 202, protocol processing circuitry 305, digital baseband circuitry 310, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as transmit circuitry 315, receive circuitry 320, radio frequency circuitry 325, similar component(s) and/or other component(s).

Although the UE 102, eNB 104, gNB 105, IAB donor, IAB node, machine 200 and/or other device described herein may each be illustrated as having several separate functional elements, one or more of the functional elements may be combined and may be implemented by combinations of software-configured elements, such as processing elements including digital signal processors (DSPs), one or more microprocessors, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, IAB donor, IAB node, machine 200, and/or other device may include various components shown in FIGS. 2-3 and/or other components. Accordingly, techniques and operations described herein that are performed by a device may be performed by an apparatus of the device, in some embodiments.

Figure 4A:
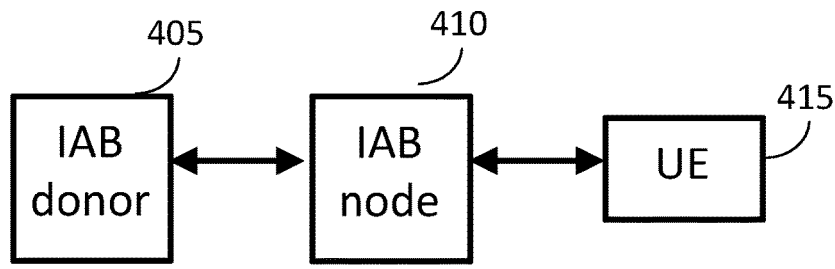
FIG. 4A illustrates example scenarios in accordance with some embodiments.

FIG. 4A illustrates example scenarios in accordance with some embodiments. FIG. 4B illustrates an example scenario in accordance with some embodiments. In references herein, "FIG. 4" may include FIG. 4A and FIG. 4B. Embodiments are not limited to the scenarios 400, 450, 480 shown in FIG. 4. Embodiments are also not limited to the number, type, name, arrangement or other aspects of elements (such as the IAB donor 405, IAB nodes 410, UEs 415 and/or other) shown in FIG. 4.

Figure 4A:
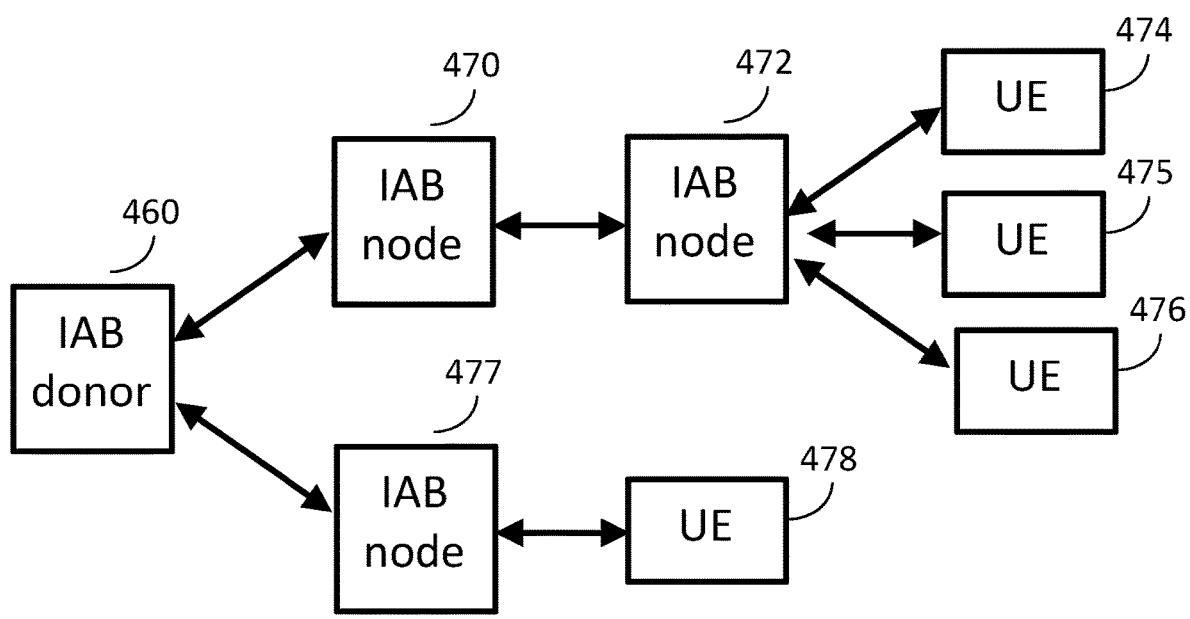
Figure 4B:
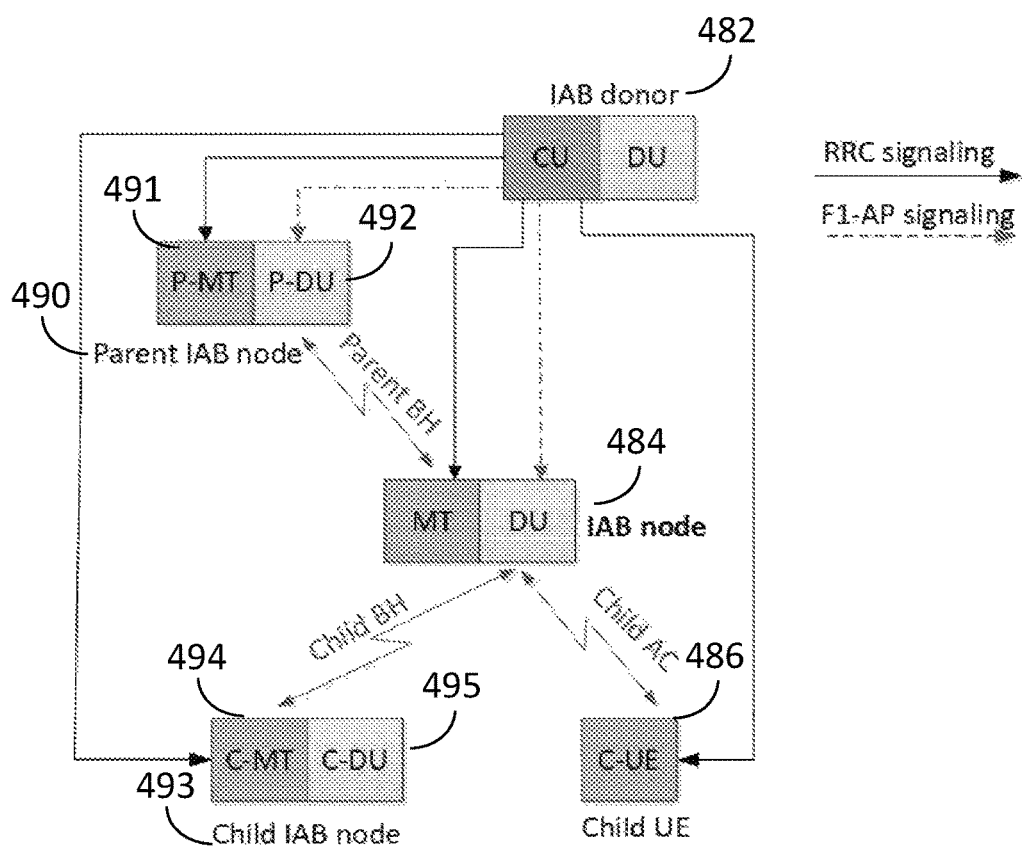
FIG. 4B illustrates an example scenario in accordance with some embodiments.

In some embodiments, an integrated access and backhaul (IAB) network may include one or more of the components shown in FIG. 4. Accordingly, the scenarios 400, 450, 480 may be related to IAB networks, although the scope of embodiments is not limited in this respect. One or more of the techniques, operations and/or methods described herein may be performed in accordance with one or more of the scenarios 400, 450, 480, although the scope of embodiments is not limited in this respect. One or more of those techniques, operations and/or methods described herein may be performed in accordance with other scenarios, in some embodiments.

In some embodiments, the IAB donor (such as 405, 460, 482) may be a gNB 105. In some embodiments, the IAB donor (such as 405, 460, 482) may be part of a gNB 105. The scope of embodiments is not limited in this respect however. In some embodiments, the IAB donor 405 may not necessarily be a gNB 105. In some embodiments, the IAB donor 405 may not necessarily be part of a gNB 105.

In the scenario 400, the IAB donor 405 may communicate with the IAB node 410, and the IAB node 410 may communicate with the UE 415. The IAB node 410 may operate as a relay between the IAB donor 405 and the UE 415.

In the scenario 450, multiple IAB nodes 470, 472 are used for communication between the IAB donor 460 and UEs 474, 475, 476. This example may be extended to more than two IAB nodes. In the scenario 450, the IAB node 470 may operate as a relay between the IAB donor 460 and the IAB node 472. Accordingly, the IAB node 470 may forward elements between the IAB donor 405 and the IAB node 472, in some embodiments. The IAB node 472 may operate as a relay between the IAB node 470 and each of the UEs 474, 475, 476. Accordingly, the IAB node 472 may forward elements between the IAB node 470 and each of the UEs 474, 475, 476. This example is not limited to three UEs 474, 475, 476, as the IAB node 472 may operate as a relay for any number of UEs (such as 1, 2, 4, or more UEs).

In the scenario 480, multiple components are shown. It should be noted that some descriptions may include terminology such as "parent IAB node," "child IAB node," and/or "child UE." Some descriptions may include terminology related to "IAB nodes," "IAB donors," and/or "UEs." Embodiments are not limited by the terminology in any of those descriptions. Concepts related to relay between multiple components may be described using some terminology (such as IAB nodes, IAB donors, UEs and/or other), but it is understood that those concepts may be applicable to arrangements that include components such as parent IAB nodes, child IAB nodes, child UEs and/or other. In addition, concepts related to relay between multiple components may be described using some terminology (such as parent IAB nodes, child IAB nodes, child UEs and/or other) but it is understood that those concepts may be applicable to arrangements that include components such as IAB nodes, IAB donors, UEs and/or other.

In accordance with some embodiments, an IAB donor 405 of an IAB network may comprise a central unit (CU) and a distributed unit (DU). The IAB network may comprise a plurality of IAB nodes 410 to operate as relays between the IAB donor 405 and one or more UEs 415. To perform resource coordination among the IAB nodes 410, the IAB donor 405 may, for each of the IAB nodes 410: allocate a plurality of subframes to the IAB node 410 for communication between the IAB node 410 and UEs 415 that are connected to the IAB node 410, wherein each allocated subframe has a subframe type that is one of: a downlink subframe, an uplink subframe, a flexible subframe or a not available subframe; and transmit, from the CU to a DU of the IAB node 410 over an F1 interface, a resource coordination request message that indicates the subframe types of the plurality of subframes. These embodiments are described in more detail below.

Figure 5:
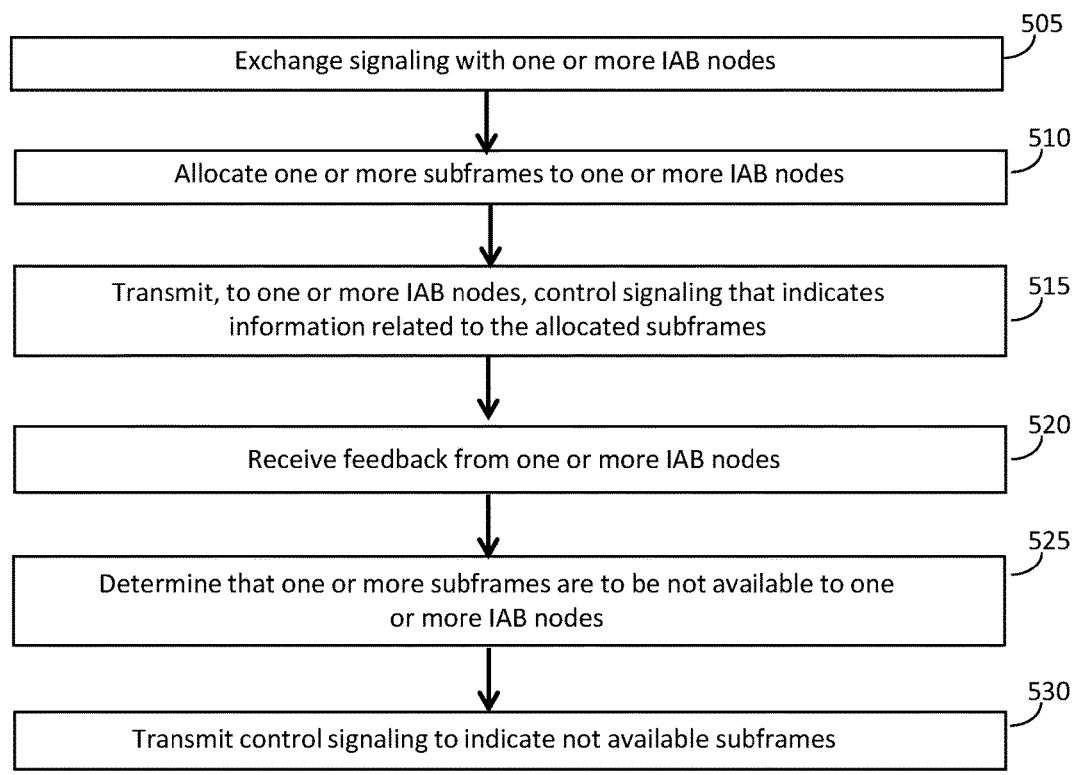
FIG. 5 illustrates the operation of a method of communication in accordance with some embodiments.
Figure 6:
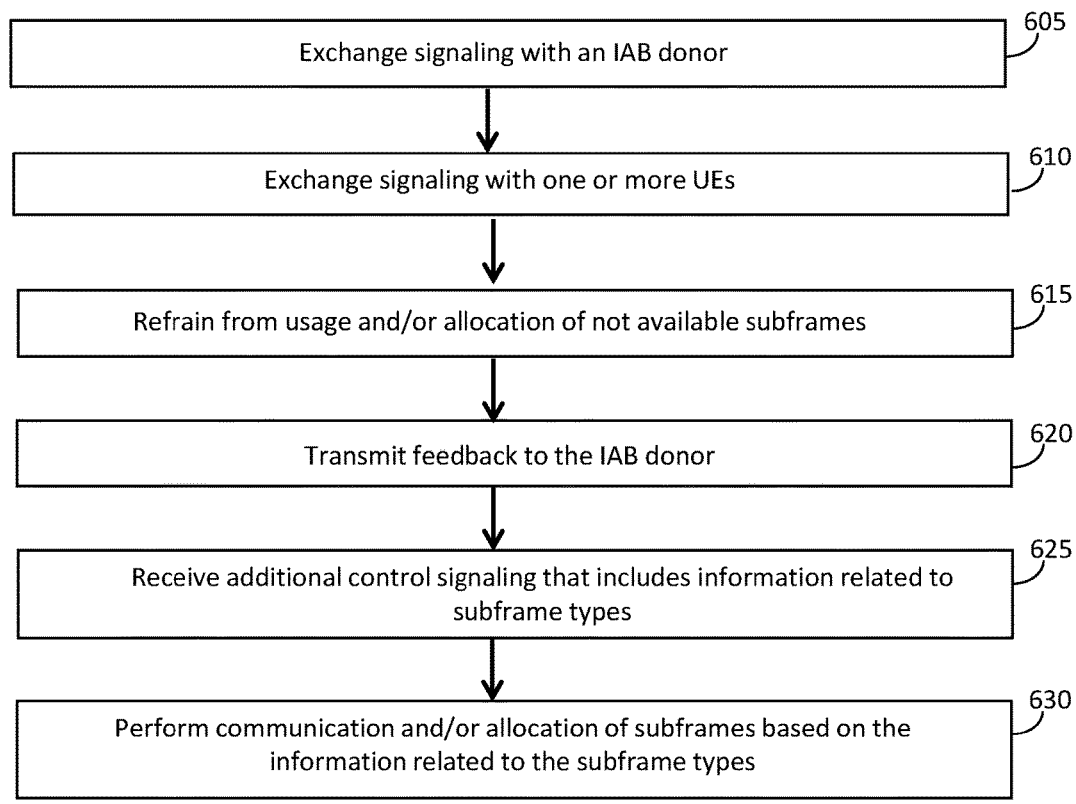
FIG. 6 illustrates the operation of a method of communication in accordance with some embodiments.

FIG. 5 illustrates the operation of a method of communication in accordance with some embodiments. FIG. 6 illustrates the operation of a method of communication in accordance with some embodiments. It is important to note that embodiments of the methods 500, 600 may include additional or even fewer operations or processes in comparison to what is illustrated in FIGS. 5-6. In addition, embodiments of the methods 500, 600 are not necessarily limited to the chronological order that is shown in FIGS. 5-6. In describing the methods 500, 600, reference may be made to one or more figures, although it is understood that the methods 500, 600 may be practiced with any other suitable systems, interfaces and components.

In some embodiments, an IAB donor 405 may perform one or more operations of the method 500, but embodiments are not limited to performance of the method 500 and/or operations of it by the IAB donor 405. In some embodiments, another device and/or component (such as the gNB 105, eNB 104, IAB node 410, UE 415, and/or other) may perform one or more operations of the method 500. In some embodiments, another device and/or component (such as the gNB 105, eNB 104, IAB node 410, UE 415 and/or other) may perform one or more operations that may be similar to, related to and/or reciprocal to one or more operations of the method 500. In a non-limiting example, the IAB node 410 may perform an operation that may be the same as, similar to, reciprocal to and/or related to an operation of the method 500, in some embodiments.

In some embodiments, an IAB node 410 may perform one or more operations of the method 600, but embodiments are not limited to performance of the method 600 and/or operations of it by the IAB node 410. In some embodiments, another device and/or component (such as the gNB 105, eNB 104, IAB donor 405, UE 415, and/or other) may perform one or more operations of the method 600. In some embodiments, another device and/or component (such as the gNB 105, eNB 104, IAB donor 405, UE 415 and/or other) may perform one or more operations that may be similar to, related to and/or reciprocal to one or more operations of the method 600. In a non-limiting example, the IAB donor 405 may perform an operation that may be the same as, similar to, reciprocal to and/or related to an operation of the method 600, in some embodiments. In another non-limiting example, the UE 415 may perform an operation that may be the same as, similar to, reciprocal to and/or related to an operation of the method 600, in some embodiments.

It should be noted that one or more operations of one method (such as 500, 600 and/or others described herein) may be the same as, similar to, related to and/or reciprocal to one or more operations of another method (such as 500, 600 and/or others described herein). For instance, an operation of the method 500 may be the same as, similar to, related to and/or reciprocal to an operation of the method 600, in some embodiments. In a non-limiting example, an operation of the method 500 may include transmission of an element (such as a frame, block, message and/or other) by the IAB donor 405, and an operation of the method 600 may include reception of the same element (and/or similar element) by the IAB node 410. In some cases, at least some of the descriptions of operations and techniques described as part of one method (such as 500, 600 and/or others described herein) may be relevant to another method (such as 500, 600 and/or others described herein).

The methods 500, 600 and other methods described herein may refer to IAB nodes 410, IAB donors 405, UEs 415 and/or other components operating in accordance with 3GPP standards, 5G standards, NR standards and/or other standards. However, embodiments are not limited to performance of those methods by those components, and may also be performed by other devices, such as a Wi-Fi access point (AP) or user station (STA). In addition, the methods 500, 600 and other methods described herein may be practiced by wireless devices configured to operate in other suitable types of wireless communication systems, including systems configured to operate according to various IEEE standards such as IEEE 802.11. The methods 500, 600 may also be applicable to an apparatus of an IAB node 410, an apparatus of a UE 415, an apparatus of an IAB donor 405, an apparatus of a gNB 105 and/or an apparatus of another device described above.

In some embodiments, an apparatus of a device (including but not limited to the IAB node 410, IAB donor 415, UE 415, eNB 104, gNB 105 and/or other) may comprise memory that is configurable to store one or more elements, and the apparatus may use them for performance of one or more operations. The apparatus may include processing circuitry, which may perform one or more operations (including but not limited to operation(s) of one or more methods (such as 500, 600 and/or other methods described herein). The processing circuitry may include a baseband processor. The baseband circuitry and/or the processing circuitry may perform one or more operations described herein. The apparatus may include a transceiver to transmit and/or receive one or more blocks, messages and/or other elements.

Embodiments are not limited by references herein to transmission, reception and/or exchanging of elements such as frames, messages, requests, indicators, signals or other elements. In some embodiments, such an element may be generated, encoded or otherwise processed by processing circuitry for transmission by a transceiver or other component cases. In some embodiments, such an element may be received by a transceiver or other component, and may be decoded, detected or otherwise processed by processing circuitry. In some embodiments, the processing circuitry and the transceiver may be included in a same apparatus. In some embodiments, the transceiver may be separate from the apparatus that comprises the processing circuitry, in some embodiments.

One or more of the elements (such as messages, operations and/or other) described herein may be included in a 3GPP protocol, 3GPP LTE protocol, 4G protocol, 5G protocol, NR protocol and/or other protocol, but embodiments are not limited to usage of those elements. In some embodiments, other elements may be used, including other element(s) in a same standard/protocol, other element(s) in another standard/protocol and/or other. In addition, the scope of embodiments is not limited to usage of elements that are included in standards.

In some embodiments, the IAB donor 405, IAB node 410, and/or UE 415 may be arranged to operate in accordance with a 3GPP protocol, NR protocol, and/or other protocol.

In some embodiments, an IAB node 410 of an IAB network may be configured to operate as a relay between an IAB donor 405 of the IAB network and a UE 415. Some descriptions herein are based on an arrangement in which the IAB node 410 communicates directly with both the UE 415 and the IAB donor 405, and operates as a relay between the UE 415 and the IAB donor 405. It is understood that such descriptions are not limiting, and that embodiments are not limited to this arrangement. For instance, one or more of the techniques, operations and/or methods described herein in terms of the above arrangement may be applicable to other arrangements, such as arrangements that include multiple IAB nodes 410, like scenario 450, scenario 480 and/or other. In a non-limiting example, an IAB node 410 may operate as a relay between the UE 415 and another IAB node 410. In another non-limiting example, an IAB node 410 may operate as a relay between the IAB donor 405 and another IAB node 410.

At operation 505, the IAB donor 405 may exchange signaling with the IAB node 410. Such signaling may include one or more messages. In some embodiments, the IAB donor 405 and the IAB node 410 may exchange signaling multiple times. Such signaling may be exchanged at multiple times throughout the method 500.

At operation 510, the IAB donor 405 may allocate one or more subframes to one or more IAB nodes 410. At operation 515, the IAB donor 405 may transmit, to one or more IAB nodes 410, control signaling that indicates information related to the allocated subframes. At operation 520, the IAB donor 405 may receive feedback from one or more IAB nodes 410. At operation 525, the IAB donor 405 may determine that one or more subframes are to be not available to one or more IAB nodes 410. At operation 530, the IAB donor 405 may transmit control signaling to indicate not available subframes.

In some embodiments, an IAB donor 405 may operate in an IAB network and/or may be part of an IAB network. In some embodiments, the IAB donor 405 may comprise a central unit (CU) and a distributed unit (DU), although the scope of embodiments is not limited in this respect. In some embodiments, the IAB network may comprise a plurality of IAB nodes 410. In some embodiments, the IAB nodes 410 may operate as relays between the IAB donor 405 and one or more UEs 415.

In some embodiments, the IAB donor 405 may perform resource coordination among the IAB nodes 410. One or more operations (such as allocation of subframes, resource coordination request message and/or other) may be performed as part of the resource coordination, although the scope of embodiments is not limited in this respect. It is understood that the IAB donor 405 may perform one or more of those operations, but may not necessarily perform the operations as part of resource coordination.

In some embodiments, the IAB donor 405 may, for each of the IAB nodes 410, allocate one or more subframes to the IAB node 410 for communication between the IAB node 410 and UEs 415 that are connected to the IAB node 410. Each allocated subframe may have a subframe type. In a non-limiting example, the subframe type may be one of: a downlink subframe, an uplink subframe, a flexible subframe or a not available subframe. Other subframe types may be used, in some embodiments.

In some embodiments, the IAB donor 405 may transmit, from the CU to a DU of the IAB node over an F1 interface, a resource coordination request message that indicates the subframe types of the plurality of subframes. Embodiments are not limited to usage of the resource coordination request message (in this operation or in other operation described herein), as other messages may be used in some embodiments. In a non-limiting example, a configuration update message may be used. In another non-limiting example, a message other than the resource coordination request message and the configuration update message may be used.

In some embodiments, the IAB donor 405 may allocate one or more subframes to each of the IAB nodes 410 to enable coordination of cross interference between the IAB nodes 410 or between the UEs 415 connected to the IAB nodes 410.

In some embodiments, the IAB donor 405 may receive, from a first IAB node 410 of the plurality of IAB nodes 410, feedback that indicates a subframe during which interference was detected at the first IAB node 410. The IAB donor 405 may determine, based at least partly on the feedback, that the subframe during which the interference was detected is not available to a second IAB node 410 of the plurality of IAB nodes 410. The IAB donor 405 may transmit, to the second IAB node 410, another resource coordination request message that indicates that the subframe during which the interference was detected is to be not available to the second IAB node 410. Embodiments are not limited to transmission of another resource coordination request to indicate this information, as another message may be used, in some embodiments.

In some embodiments, the IAB donor 405 may allocate one or more subframes to each of the IAB nodes 410 to enable avoidance of simultaneous transmission and reception by IAB nodes 410 configured for half-duplex operation. In some embodiments, the IAB donor may receive, from one of the IAB nodes 410 of the plurality of IAB nodes 410, feedback that indicates a half duplex constraint (and/or information related to half duplex operation) of the IAB node 410.

In a non-limiting example, the IAB donor 405 may determine, based at least partly on the feedback, one or more subframes that are to be not available to the IAB node 405. The IAB donor 405 may transmit, to the IAB node 410, another resource coordination request message (and/or other message) that indicates that the subframe during which the interference was detected is to be not available to the IAB node 410.

In another non-limiting example, the IAB donor 405 may determine, based at least partly on the feedback, one or more subframes that are to be not available to another IAB node 405. The IAB donor 405 may transmit, to the other IAB node 410, another resource coordination request message (and/or other message) that indicates that the subframe during which the interference was detected is to be not available to the other IAB node 410.

In some embodiments, the IAB donor 405 may allocate one or more subframes to one or more of the IAB nodes 410 based on one or more of: coordination of cross interference between the IAB nodes 410, coordination of cross interference between UEs 415, coordination of cross interference between the IAB nodes 410 and/or UEs 415, half-duplex constraints of the IAB nodes 410 and/or UEs 415, half-duplex operation of the IAB nodes 410 and/or UEs 415, to enable avoidance of simultaneous transmission and reception by IAB nodes 410 configured for half-duplex operation, to enable avoidance of simultaneous transmission and reception by UEs 415 configured for half-duplex operation, and/or one or more other factors.

In some embodiments, the IAB donor 405 may encode each of the resource coordination request messages to include one or more of the following information (and/or similar information): a message type; a transaction ID; a request type; an Evolved Universal Terrestrial Radio Access (E-UTRA)—New Radio (NR) cell resource coordination request container; an IAB cell resource coordination request; a list of NR cells; for each of the NR cells—an NR cell-ID, one or more subframe types, and/or other; and/or other information.

In some embodiments, the IAB donor 405 may determine that one or more frequency resources are not available to one of the IAB nodes 410. The IAB donor 405 may transmit, over an F1 interface from the CU to a DU of the IAB node 410 for which the one or more frequency resources are not available, another resource coordination request message (and/or other message) that indicates the one or more frequency resources that are not available.

In some embodiments, one or more of the following may be applicable: a downlink subframe may be for downlink communication from an IAB node 410 to one or more UEs 415; an uplink subframe may be for uplink communication from one or more UEs 415 to an IAB node 410; a flexible subframe may be for either uplink communication or downlink communication; if a subframe is a not available subframe for an IAB node, the not available subframe is to not be used by the IAB node 410 or allocated to UEs 415 connected to the IAB node 410.

In some embodiments, the IAB donor 405 may transmit one or more data packets intended for a UE 415, wherein the one or more data packets are transmitted to one of the IAB nodes 410 for forwarding to the UE 415. In some embodiments, the IAB donor 405 may receive one or more data packets from an IAB node 410 on behalf of a UE 415.

In some embodiments, the IAB donor 405 may, for each of the IAB nodes 410, assign a subframe type to each subframe of a plurality of subframes. In some embodiments, the subframe type may be one of: a downlink subframe, an uplink subframe, a flexible subframe, and a not available subframe. In some embodiments, the IAB donor 405 may jointly determine the subframe types of the plurality of subframes for the plurality of IAB nodes based on one or more of: coordination of cross interference between the IAB nodes 410 and/or the UEs 415 connected to the IAB nodes 410; avoidance of simultaneous transmission and reception by IAB nodes 410 configured for half-duplex operation; and/or other. In some embodiments, the IAB donor 405 may transmit, to each of the IAB nodes 410 over an F1 interface, control signaling that indicates the subframe types determined for the IAB node 410.

In some embodiments, the IAB donor 405 may be a gNB 105. In some embodiments, the resource coordination request messages may be DU resource coordination request messages.

At operation 605, the IAB node 410 may exchange signaling with the IAB donor 405. Such signaling may include one or more messages. In some embodiments, the IAB node 410 and the IAB donor 405 may exchange signaling multiple times. Such signaling may be exchanged at multiple times throughout the method 600, in some embodiments.

At operation 610, the IAB node 410 may exchange signaling with one or more UEs 415. Such signaling may include one or more messages. In some embodiments, the IAB node 410 and the one or more UEs 415 may exchange signaling multiple times. Such signaling may be exchanged at multiple times throughout the method 600, in some embodiments.

At operation 615, the IAB node 410 may refrain from usage and/or allocation of not available subframes. At operation 620, the IAB node 410 may transmit feedback to the IAB donor 405. At operation 625, the IAB node 410 may receive additional control signaling that includes information related to subframe types. At operation 630, the IAB node 410 may perform communication and/or allocation of subframes based on the information related to the subframe types.

In some embodiments, the IAB node 410 may receive control signaling from the IAB donor 405. In some embodiments, the IAB node 410 may receive the control signaling over an F1 interface, although the scope of embodiments is not limited in this respect. In some embodiments, the control signaling may indicate, for each subframe of a plurality of subframes, whether the subframe is allocated as a downlink subframe, an uplink subframe, a flexible subframe, or a not available subframe. In some embodiments, the control signaling may be a resource coordination request message. In some embodiments, the control signaling may be a configuration update message. Embodiments are not limited to usage of the resource coordination request message or the configuration update message, as another message may be used in some embodiments.

In some embodiments, the IAB node 410 may receive, from the IAB donor 405, a downlink data packet intended for a first UE 415 that is connected to the IAB node 410. The IAB node 410 may forward the downlink data packet to the first UE 415 during a downlink subframe. The IAB node 410 may allocate one of the uplink subframes to a second UE 415. The IAB node may, if one or more subframes are not available subframes, perform one or more of: refrain from transmission during the not available subframes; refrain from allocation of the not available subframes to UEs 415 that are connected to the IAB node 410; and/or other.

In some embodiments, the IAB node 410 may receive, from the IAB donor 405, another downlink data packet intended for a UE 415 that is indirectly connected to the IAB donor 405 through another IAB node 410. The IAB node 410 may forward the downlink data packet to the other IAB node 410 during a downlink subframe for forwarding to the UE 415. For instance, the IAB node 410 may be referred to as a first IAB node 410 for clarity. The first IAB node 410 may receive a downlink data packet intended for a UE 415 that is connected to a second IAB node 410. The first IAB node 410 may forward the downlink data packet to the second IAB node 410 for forwarding to the UE 415. This example may be extended to more than two IAB nodes 410, in some embodiments.

In some embodiments, the IAB node 410 may comprise a Mobile Terminating (MT) unit and a distributed unit (DU). In some embodiments, the IAB node 410 may receive signaling at the MT unit from a central unit (CU) of the IAB donor 405. In some embodiments, the IAB node 410 may transmit signaling from the DU to the UE 415.

It should be noted that descriptions below and/or other descriptions herein may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) described below and/or elsewhere herein. Although some of the elements described below (and/or elsewhere herein) may be included in a 3GPP standard, NR standard, 5G standard and/or other standard, embodiments are not limited to usage of such elements that are included in standards.

Some embodiments may be related to F1AP Signaling for IAB central coordination regarding "not available resources." It should be noted that some descriptions may refer to "unavailable resources," and some descriptions may refer to "not available resources." It is understood that such references are not limiting. In some cases, the two terms may be interchangeable. For instance, an operation described herein may include usage of a "not available subframe." It is understood that the same operation or a similar operation may use an "unavailable subframe" instead of the "not available subframe," in some embodiments.

In some cases related to IAB, regarding time-domain resource, from a Mobile-Termination (MT) or a User Equipment (UE) point-of-view, downlink/uplink/flexible (D/U/F) time resource can be indicated for the parent link as in Rel-15 specifications. From a DU point-of-view, the child link has the downlink/uplink/flexible/not available (D/U/F/NA) types of time resource. For the scenario of central coordination due to cross-link interference, etc., the NA time resource for an IAB node's child links are indicated from the central unit (CU) to the distributed unit (DU) of the IAB node. Since current Rel-15 specifications do not accommodate this property, F1AP signaling from the CU of IAB donor 405 to the DU of an IAB node 410 will be needed to indicate NA resource. Some embodiments may be related F1AP signaling from the central unit (CU) in the IAB donor 405 to the distributed unit (DU) in an IAB node 410 to indicate not available (NA) resource for central coordination.

In some cases, in an IAB network, an IAB node 410 can connect to its parent node (an IAB donor 405 or another IAB node 410) through parent backhaul (BH) link; connect to a child user equipment (UE) through child access (AC) link; and connect to its child IAB node through child BH link. In some cases, central unit (CU)/distributed unit (DU) split has been leveraged, wherein each IAB node 410 holds a DU and a Mobile-Termination (MT) function: Via the MT function, the IAB node 410 connects to its parent IAB node or the IAB-donor 405 like a UE 415; Via the DU function, the IAB node 410 communicates with UEs 415 and MTs of child IAB nodes like a base station. Signaling between the MTs on an IAB node 410 or UEs 415 and the CU on the IAB donor 405 uses RRC protocol, while signaling between DU on an IAB node 410 and the CU on the IAB donor 405 uses F1-AP protocol.

In FIG. 4, a non-limiting example 480 of the IAB CU/DU split architecture and signaling is shown, wherein MT and DU in parent IAB node 490 are marked as P-MT 491 and P-DU 492; MT and DU in child IAB node 493 as C-MT 494 and C-DU 495; child UE as C-UE 486.

In some cases, regarding time-domain resource, from an MT/UE point-of-view, downlink/uplink/flexible (D/U/F) time resource can be indicated for the parent link as in Rel-15 specifications. Hence, IAB can use Rel-15 NR design for semi-static time-domain resource allocation (D/U/F time-domain resource indication), which can be done centrally at the CU and signal to MTs/UEs via RRC signaling. For example, in FIG. 4, the D/U/F time resource indicated from CU to MT via RRC signaling will be used for parent BH link; the D/U/F time resource indicated from CU to C-MT via RRC signaling will be used for child BH link; the D/U/F time resource indicated from CU to C-UE via RRC signaling will be used for child AC link.

In some embodiments, from a DU point-of-view, the child link has the following types of time resource: downlink time resource (D); uplink time resource (U); flexible time resource (F); not available time resource (NA) (which may be referred to as "unavailable" in some cases).

Some embodiments may be related to IAB central coordination about NA resource. From the DU of an IAB node point-of-view, the additional defined NA type of time resource may be present with different scenarios, including but not limited to the following: in "Scenario 1," due to half-duplex constraint, adjacent hops need to be adjusted so that an IAB node 410 does not need to transmit and receive at the same time; in "Scenario 2," IAB central coordination may be performed due to cross-link interference. For Scenario 1, since an IAB node 410 already has the knowledge of its parent BH link and access links D/U/F configurations, it can coordinate by itself to overwrite some of its child link resource as NA resource to facilitate the parent BH transmission. For Scenario 2, the NA resource for the child links are indicated from the central CU. In some embodiments, since current Rel-15 specifications do not accommodate this property, F1AP signaling from the CU of IAB donor 405 to the DU of an IAB node 410 may be needed to indicate NA time resource whenever it is necessary. Other than indicating NA time resource, the CU can indicate the available time resource.

In some embodiments, in addition to time resource coordination, the CU can also use the F1AP signaling to coordinate frequency domain resource allocation among DUs. To this end, the CU can either indicate available frequency resource to the DUs or indicate not-available frequency resource to the DUs.

In some embodiments, for IAB central coordination regarding NA resource (time-domain and frequency-domain), the CU can indicate one or more of the following to the DUs with F1AP message: available time resource or non-available time resource; available frequency resource or non-available frequency resource; and/or other.

Some embodiments may be related to F1AP signaling options for IAB central coordination regarding NA resource. To facilitate the above mechanism, three F1AP protocol extension embodiments are proposed. In "Option 1," enhancement of the existing GNB-DU RESOURCE COORDINATION REQUEST F1AP message may be used. In "Option 2," enhancement of the existing GNB-CU CONFIGURATION UPDATE F1AP message may be used. In "Option 3," another dedicated F1AP message (including but not limited to a new message) may be used.

An example message in accordance with Option 1 is shown below. Embodiments are not limited by this example message in terms of name, number, type, size, ordering and/or other aspects of the fields shown in this example message. In some embodiments, the message may include one or more alternate fields and/or similar fields. In some embodiments, the message may include one or more additional fields. In some embodiments, the message may not necessarily include all fields shown in the example below.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| Request type | M | | ENUMERATED (offer, execution, . . . ) | | YES | reject |
| E-UTRA - NR Cell Resource Coordination Request Container | O | | OCTET STRING | Includes the X2AP E-UTRA - NR CELL RESOURCE COORDINATION REQUEST message as defined in subclause 9.1.4.24 in TS 36.423 [9]. | YES | reject |
| IAB Cell Resource Coordination Request | O | | | | | |
| >>List of NR Cells in NR Coordination Request | | 0 .. <maxnoNRcells> | | List of applicable NR cells | YES | reject |
| >>>NR-Cell ID | M | | NR-CGI 9.2.105 | | — | — |
| >>>Subframe Assignment | M | | ENUMERATED (dl, ul, f, na, . . . ) | Uplink-downlink subframe configuration information. | — | — |
| >>> frequency resource | M | | OCTET STRING | Frequency resource configuration information | — | — |

Embodiments of Option 2 and Option 3 can be defined in a similar manner, although the scope of embodiments is not limited in this respect.

In some embodiments, an F1AP message of GNB-DU RESOURCE COORDINATION REQUEST may be sent by a gNB-CU to a gNB-DU, to express the desired resource allocation for data traffic, for the sake of resource coordination. The message triggers gNB-DU resource coordination (for NR-initiated resource coordination), to indicate an initial resource offer by the E-UTRA node (for E-UTRA-initiated gNB-DU Resource Coordination), or to indicate the agreed resource allocation that is to be executed, or to indicate IAB resource coordination information.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A comprising memory configured to cause the processor to perform operations comprising:
   perform resource configuration for an Integrated Access and Backhaul (IAB) node of an IAB network, wherein the IAB node comprises a distributed unit (DU), wherein the IAB node operates as a relay between an IAB donor, a child IAB node, and one or more User Equipments (UEs), wherein the IAB donor comprises a central unit (CU), and wherein to perform resource configuration for the IAB node, the processor is further configured to:
   receive, at the DU of the IAB node, from the CU of the IAB donor over an F1 interface, a resource configuration message including time configuration information that includes at least one time resource indicated as 'not available' for a child link (CL), wherein the resource configuration message additionally includes time resources information comprising an indication of downlink, uplink, and flexible time resources for communication, over the CL, between the DU and:
   the child IAB node; or
   the one or more UEs.

2. The processor of claim 1, wherein the processor is further configured to:
   receive the resource configuration message as an F1 AP (Application Protocol) message different from Rel-15 Resource Coordination Request and GNB-CU CONFIGURATION UPDATE F1AP messages.

3. The processor of claim 1, wherein the processor is further configured to:
   receive the resource configuration message to include:
   a message type,
   a transaction ID,
   a list of NR cells,
   for each of the NR cells:
   an NR cell-ID.

4. The processor of claim 1, wherein the processor is further configured to:
   encode a first data packet for transmission to the IAB donor on behalf of the UE; and
   decode a second data packet received from the IAB donor for forwarding to the UE.

5. The processor of claim 1, wherein:
   the IAB donor is a gNB node in a Previously Presented Radio (NR) system, and
   the resource configuration message is a gNB-DU resource configuration message.

6. The processor of claim 1, wherein:
the processor is a baseband processor to decode the resource configuration message.

7. The processor of claim 1, wherein the processor is further configured to:
receive frequency configuration information in the resource configuration message that includes at least one frequency resource indicated as 'not available' for the CL.

8. The processor of claim 1, wherein the at least one time resource indicated as 'not available' for the CL overwrites configured CL resources.

9. A non-transitory computer-readable storage medium storing program instructions executable by at least one processor of an Integrated Access and Backhaul (IAB) node of an IAB network, wherein the IAB node comprises a distributed unit (DU), wherein the IAB node operates as a relay between an IAB donor, a child IAB node, and a plurality of user equipments (UEs), wherein the IAB donor comprises a central unit (CU), and wherein to perform resource configuration for the IAB node, the program instructions are executable to cause the at least one processor to:
receive, at the DU of the IAB node, from the CU of the IAB donor over an F1 interface, a resource configuration message including frequency configuration information that includes at least one frequency resource indicated as 'not available' for a child link (CL), wherein the resource configuration message additionally includes time resources information comprising an indication of downlink, uplink, and flexible time resources for communication, over a child link (CL) between the DU and:
the child IAB node; or
the plurality of UEs.

10. The non-transitory computer-readable storage medium of claim 9, wherein the program instructions are further executable to cause the at least one processor to:
receive time configuration information in the resource configuration message that includes at least one time resource indicated as 'not available' for the CL.

11. The non-transitory computer-readable storage medium of claim 10, wherein the at least one frequency resource indicated as 'not available' for the CL overwrites configured CL resources.

12. The non-transitory computer-readable storage medium of claim 9, wherein the program instructions are further executable to cause the at least one processor to:
receive the resource configuration message as an F1 AP (Application Protocol) message different from Rel-15 Resource Coordination Request and GNB-CU CONFIGURATION UPDATE F1AP messages.

13. The non-transitory computer-readable storage medium of claim 9, wherein the program instructions are further executable to cause the at least one processor to:
receive the resource configuration message to include:
a message type,
a transaction ID,
a list of NR cells,
for each of the NR cells:
an NR cell-ID.

14. A method, comprising:
by at least one processor comprising memory configured to cause the processor to perform operations comprising:
performing resource configuration for an Integrated Access and Backhaul (IAB) node of an IAB network, wherein the IAB node comprises a distributed unit (DU), wherein the IAB node operates as a relay between an IAB donor, a child IAB node, and one or more User Equipments (UEs), and wherein the IAB donor comprises a central unit (CU); and
receiving, at the DU of the IAB node, from the CU of the IAB donor over an F1 interface, a resource configuration message including at least one of time or frequency configuration information that includes one or more time or frequency resources indicated as 'not available' for a child link (CL), wherein the resource configuration message additionally includes time resources information comprising an indication of downlink, uplink, and flexible time resources for communication, over a child link (CL) between the DU and:
the child IAB node; or
the one or more UEs.

15. The method of claim 14, wherein at least one time resource of the one or more time or frequency resources indicated as 'not available' for the CL overwrites configured CL resources.

16. The method of claim 14, further comprising:
receiving the resource configuration message as an F1 AP (Application Protocol) message different from Rel-15 Resource Coordination Request and GNB-CU CONFIGURATION UPDATE F1AP messages.

17. The method of claim 14, wherein at least one frequency resource of the one or more time or frequency resources indicated as 'not available' for the CL overwrites configured CL resources.

18. The method of claim 14, further comprising:
receiving the resource configuration message to include:
a message type,
a transaction ID,
a list of NR cells,
for each of the NR cells:
an NR cell-ID.

19. The method of claim 14, further comprising:
encoding a first data packet for transmission to the IAB donor on behalf of the UE; and
decoding a second data packet received from the IAB donor for forwarding to the UE.

20. The method of claim 14, wherein:
the IAB donor is a gNB node in a Previously Presented Radio (NR) system, and
the resource configuration message is a gNB-DU resource configuration message.

* * * * *